United States Patent
Terai et al.

(10) Patent No.: US 10,046,693 B2
(45) Date of Patent: Aug. 14, 2018

(54) VEHICLE LAMP AND VEHICLE REAR PANEL

(71) Applicants: KOITO MANUFACTURING CO., LTD., Tokyo (JP); KABUSHIKI KAISHA TOYOTA JIDOSHOKKI, Kariya-shi, Aichi (JP)

(72) Inventors: Hideaki Terai, Kariya (JP); Akira Moriyama, Kariya (JP); Mitsuhiko Nishijima, Shizuoka (JP); Koji Uchino, Shizuoka (JP)

(73) Assignees: KOITO MANUFACTURING CO., LTD., Minato-ku, Tokyo (JP); KABUSHIKI KAISHA TOYOTA JIDOSHOKKI, Kariya-shi, Aichi (JP)

(*) Notice: Subject to any disclaimer, the term of this patent is extended or adjusted under 35 U.S.C. 154(b) by 87 days.

(21) Appl. No.: 14/202,440

(22) Filed: Mar. 10, 2014

(65) Prior Publication Data
US 2014/0254186 A1    Sep. 11, 2014

(30) Foreign Application Priority Data

Mar. 11, 2013  (JP) ................................. 2013-047672

(51) Int. Cl.
*B60Q 1/00* (2006.01)
*B60Q 3/00* (2017.01)
(Continued)

(52) U.S. Cl.
CPC ............. *B60Q 1/24* (2013.01); *B60Q 1/0041* (2013.01); *B60Q 1/2607* (2013.01); *B60Q 1/268* (2013.01);
(Continued)

(58) Field of Classification Search
CPC ...... B60Q 1/268; B60Q 1/2619; B60Q 1/302; B60Q 1/2623; B60Q 1/24; B60Q 1/2664;
(Continued)

(56) References Cited

U.S. PATENT DOCUMENTS 5,178,919 A * 1/1993 Mimura ................. B60R 13/04
                                                    296/93
5,268,825 A * 12/1993 Blancheton .......... B60Q 1/0047
                                                    362/288
(Continued)

FOREIGN PATENT DOCUMENTS

JP    2009-212076 A    9/2009
JP    2011186413 A     9/2011
(Continued)

OTHER PUBLICATIONS

Office Action dated Jul. 7, 2015 issued by the Japanese Patent Office in counterpart Japanese Patent Application No. 2013-047672.
(Continued)

*Primary Examiner* — Erin Kryukova
(74) *Attorney, Agent, or Firm* — Sughrue Mion, PLLC

(57) ABSTRACT

A vehicle lamp includes a light guiding portion configured to be provided in at least one section of a vehicle body panel of a vehicle, and a light source arranged to input light into the light guiding portion such that the light is guided inside the light guiding portion. The light guiding portion has an inner surface and an outer surface. The inner surface is configured to face toward an inside of the vehicle and to serve as a light blocking surface to block the light. The outer surface is configured to face toward an outside of the vehicle and to serve as a light exiting surface from which the light is allowed to exit the light guiding portion. The vehicle body panel may be a vehicle rear panel having a resin molded
(Continued)

portion, and the vehicle lamp may be provided integrally with the resin molded portion.

15 Claims, 5 Drawing Sheets

(51) Int. Cl.
*B60Q 1/26* (2006.01)
*F21V 9/00* (2018.01)
*F21V 7/04* (2006.01)
*B60Q 1/24* (2006.01)
*B60Q 1/30* (2006.01)
*F21V 8/00* (2006.01)
*F21S 43/14* (2018.01)
*F21S 43/27* (2018.01)
*F21S 43/239* (2018.01)
*F21S 43/241* (2018.01)
*F21S 43/245* (2018.01)

(52) U.S. Cl.
CPC .......... *B60Q 1/2661* (2013.01); *B60Q 1/302* (2013.01); *F21S 43/14* (2018.01); *F21S 43/239* (2018.01); *F21S 43/241* (2018.01); *F21S 43/245* (2018.01); *F21S 43/27* (2018.01); *G02B 6/0095* (2013.01)

(58) Field of Classification Search
CPC ............ B60Q 1/2607; B23B 17/10036; B32B 17/100064; B32B 17/10064; F21S 48/24; F21S 48/2237; F21S 48/2243; F21S 48/2268; F21S 48/2225; F21S 48/215; F21S 48/2206; F21S 48/225; F21S 48/00; F21S 43/27; F21S 43/239; F21S 43/241; F21S 43/14; F21S 43/245; G02B 6/0095; G02B 6/0043; G02B 6/0036
See application file for complete search history.

(56) References Cited

U.S. PATENT DOCUMENTS

| 6,000,814 | A | * | 12/1999 | Nestell | F21S 48/1208 362/267 |
| 6,879,355 | B1 | * | 4/2005 | Kim | G02B 6/0036 349/62 |
| 7,991,257 | B1 | * | 8/2011 | Coleman | B29D 11/0073 264/1.24 |
| 2002/0085389 | A1 | * | 7/2002 | Cheron | B60Q 1/2696 362/545 |
| 2004/0105274 | A1 | * | 6/2004 | Pommeret | B60J 1/00 362/487 |
| 2006/0044825 | A1 | * | 3/2006 | Sa | B60Q 1/0058 362/600 |
| 2008/0002427 | A1 | * | 1/2008 | Kropac | B60Q 1/26 362/606 |
| 2008/0013333 | A1 | * | 1/2008 | Koizumi | B60Q 1/2696 362/511 |
| 2008/0232127 | A1 | * | 9/2008 | Futami | F21S 48/215 362/511 |
| 2012/0104790 | A1 | * | 5/2012 | Plavetich | B60Q 1/268 296/146.16 |
| 2012/0320621 | A1 | * | 12/2012 | Kleo | B32B 17/10018 362/558 |
| 2014/0254187 | A1 | | 9/2014 | Massault et al. | |

FOREIGN PATENT DOCUMENTS

JP 2012209167 A 10/2012
WO 2013068679 A1 5/2013

OTHER PUBLICATIONS

Office Action dated Feb. 3, 2015, issued by the Japanese Intellectual Property Office in counterpart Japanese Application No. 2013-047672.

* cited by examiner

VEHICLE LAMP AND VEHICLE REAR PANEL

CROSS-REFERENCE TO RELATED APPLICATION

The present application claims priority from Japanese Patent Application No. 2013-047672 filed on Mar. 11, 2013, the entire content of which is incorporated herein by reference.

FIELD OF INVENTION

The present disclosure relates to a vehicle lamp having a light guide, and a vehicle rear panel in which the lamp is arranged.

DESCRIPTION OF RELATED ART

With the demand for smaller, lighter bodies on vehicles such as automobiles, light guides have been proposed as components of lamps to be mounted on vehicle bodies. According to a related art example, a surface light emitting structure having a light guide is provided. The light guide is formed as a transparent plate inside which light can be guided. The surface light emitting structure is configured such that one surface of the light guide reflects a portion of the light guided inside the light guide and such that another portion of the light is allowed to exit to the outside through the light guide. The other surface of the light guide is configured to totally reflect the light guided inside the light guide. Reflectors and lenses that have been necessary in conventional vehicle lamps are rendered unnecessary by employing such a configuration, enabling configuration to be simplified and in particular enabling the lamp to made thinner by reducing the dimension in the optical axis direction of the lamp (see, e.g., JP 2009-212076 A).

According to this related art example, however, a portion of the light is blocked by reflection, so that the light-emitting area is reduced by the amount of light that is blocked. Moreover, since a configuration that allows another portion of the light to exit is required, the overall configuration is complex and cost-related issues arise. In particular, when providing such a light guide on a vehicle body panel such as a rear panel of a vehicle, the light guide that is formed separately from the vehicle body panel needs to be incorporated in the vehicle body panel, making the assembly operation cumbersome.

BRIEF SUMMARY

Illustrative aspects of the present invention provide a vehicle lamp that is easy to be incorporated in a vehicle body panel with a simplified structure, and a vehicle rear panel including the vehicle lamp.

According to an illustrative aspect of the present invention, a vehicle lamp includes a light guiding portion configured to function as a light guide and to be provided in at least one section of a vehicle body panel of a vehicle, and a light source arranged to input light into the light guiding portion such that the light is guided inside the light guiding portion. The light guiding portion has an inner surface and an outer surface. The inner surface is configured to face toward an inside of the vehicle and to serve as a light blocking surface to block the light. The outer surface is configured to face toward an outside of the vehicle and to serve as a light exiting surface from which the light is allowed to exit the light guiding portion.

A light blocking layer may be provided on the inner surface of the light guiding portion. The outer surface of the light guiding portion may be configured to diffuse the light. For example, light diffusing elements such as stippled steps may be formed on the outer surface of the light guiding portion. The vehicle lamp may further include a transparent protective layer covering the outer surface. The protective layer may be a hard coat film.

The light guiding portion may be configured to be arranged in the section other than a window section of the vehicle body panel. The light guiding portion may be provided integrally with a member of the vehicle body panel in another section of the vehicle body panel by a two-color molding, an adhesion, or a mechanical connection.

According to another illustrative aspect of the present invention, a vehicle rear panel includes a resin molded portion, and the vehicle lamp described above. The vehicle lamp is provided integrally with the resin molded portion.

According to the vehicle lamp described above, the outer surface of the light guiding portion formed in a section of the vehicle body panel is configured as a light exiting surface so that the light guiding portion functions as a lamp. Therefore, the configuration of the lamp is simplified, and the lamp can be easily incorporated in the vehicle body panel. Moreover, the inner surface of the light guiding portion configured to serve as the light blocking surface prevents the light from exiting the light guiding portion toward the inside of the vehicle, so that occupants of the vehicle is prevented from being dazzled.

According to a configuration in which the light guiding portion is arranged within the section other than the window section of the vehicle body panel, a view through the window is not impaired. When the lamp is not turned on, it does not appear as a lamp. The lamp gives its appearance as a lamp only when it is turned on. Therefore, it gives a sense of surprise and distinctiveness in external appearance, enabling to provide the lamp with an innovative appearance. By integrating light guiding portion with a member of the vehicle body panel in the other section of the vehicle body panel by a two-color molding, an adhesion, or a mechanical connection, the structure of the lamp and the vehicle body panel can be simplified and becomes easy to manufacture.

According to the vehicle rear panel described above, the vehicle lamp is incorporated in the vehicle rear panel, and at least a portion of the vehicle rear panel is resin molded. That is, a portion in a section not including the vehicle lamp or a portion in a section including the light guiding portion of the vehicle lamp can be manufactured all together by resin molding, thereby making the manufacture easier and reducing manufacturing cost.

DETAILED DESCRIPTION

Figure 1:
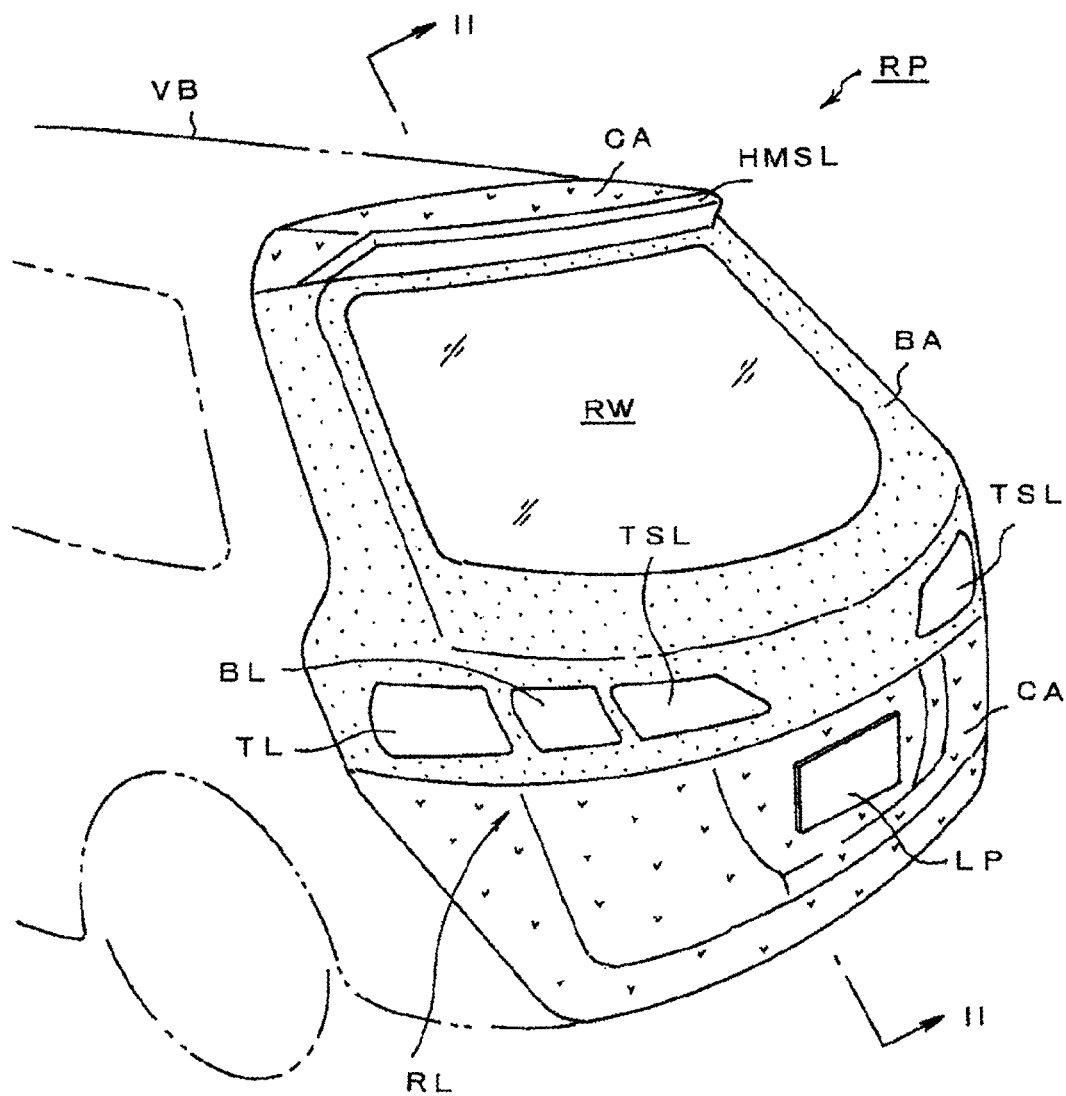
FIG. 1 is an external perspective view of a rear panel of an automobile having a lamp according to an exemplary embodiment of the present invention.

Hereinafter, an exemplary embodiment of the present invention will be described with reference to the drawings. FIG. 1 is an external view of an exemplary embodiment in which the present invention is applied to a rear panel of a hatchback type vehicle. As illustrated in FIG. 1, when the rear panel RP is viewed from the rear of the vehicle, a substantially upper half section of the rear panel RP is configured as a rear window RW made of clear smoked glass or resin. A section along the lateral sides and the lower side of the rear window RW, shaded with dots in FIG. 1, is configured as a black-appearance section BA having a black colored appearance. Left and right rear lamps RL are provided in left and right portions of the black-appearance section BA, respectively. A section extending substantially straight in the vehicle width direction along an upper side of the rear window RW, and a section below the black-appearance section BA, indicated with v marks in FIG. 1, are configured as vehicle body color sections CA coated in an optional vehicle body color. A high mount stop lamp HMSL configured to emit light in a form of a horizontal straight line is provided in the vehicle body color section CA on the upper side. In this exemplary embodiment, the exterior color of the vehicle body color sections CA is white or gray. A license plate LP (a number plate) is attached in the vehicle body color section CA on the lower side.

The left and right rear lamps RL each includes a tail and stop lamp TSL, a backup lamp BL and a turn signal lamp TL. These lamps are configured as independent lamps, and are mounted on the rear panel RP in a specific layout pattern. In this exemplary embodiment, the tail and stop lamps TSL and the high mount stop lamp HMSL are examples of a vehicle lamp according to the present invention. Accordingly, the tail and stop lamps TSL and the high mount stop lamp HMSL will be described in detail, and detailed description of the other lamps BL, TL will be omitted.

Figure 2:
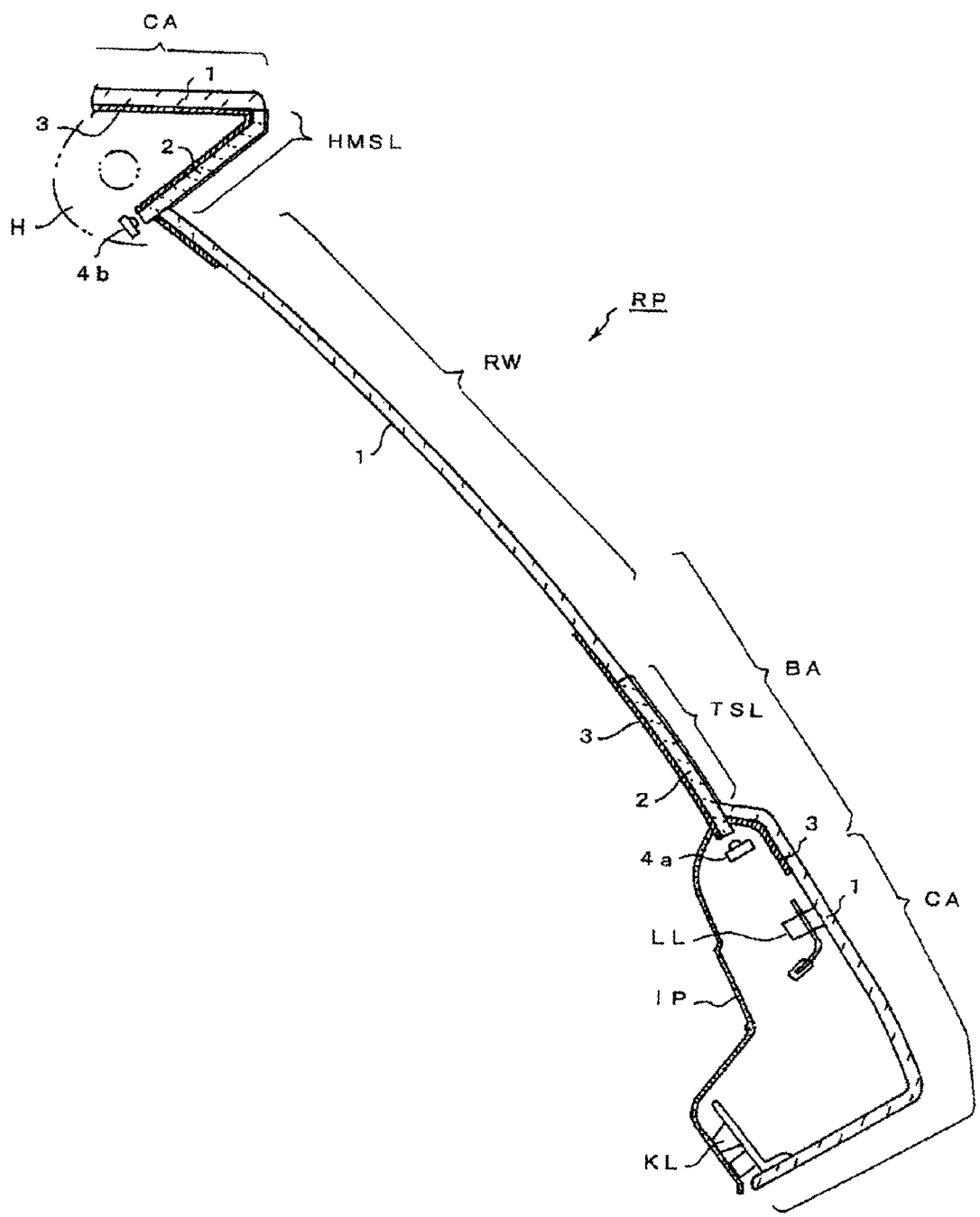
FIG. 2 is an enlarged sectional view taken along the line II-II of FIG. 1.

FIG. 2 is a vertical sectional view taken along the line II-II of FIG. 1. As illustrated in FIG. 2, an upper end portion of the rear panel RP is coupled to, and supported by an upper portion of a vehicle body VB of the vehicle illustrated in FIG. 1 via a hinge mechanism H schematically illustrated by a chain line. By operating a lower end portion of the rear panel RP, the rear panel RP is rotated in an up-down direction, so as to open or to close a rear opening of the vehicle body VB. At a lower section of the inner surface side of the rear panel RP, a cavity is formed by an inwardly bent inner panel IP. Components arranged inside the cavity include a light source 4 of the tail and stop lamp TSL, a portion of a license lamp LL for illuminating the license plate LP, and a key lock mechanism KL of the rear panel RP.

Sections of the rear panel RP, not including the respective light emitting surfaces of the high mount stop lamp HMSL and the rear lamps RL, in particular the tail and stop lamps TSL, include clear smoked resin molded portions 1. The clear smoked resin molded portions 1 are made of clear smoked resin, for example, a polycarbonate resin containing carbon black at an appropriate concentration to lower the light transmission rate. Sections including the respective light emitting surfaces of the high mount stop lamp HMSL and the tail and stop lamps TSL include clear resin molded portions 2 made of clear resin, for example, a transparent polycarbonate resin. Each of the clear resin molded portions 2 forms a light guiding portion configured to function as a light guide. The clear smoked resin portion 1 and the clear resin portion 2 are integrally formed. In this exemplary embodiment, clear smoked resin portion 1 and the clear resin portion 2 are integrally molded by two-color molding. A black coating film 3 is formed by coating an inner surface of a section of the integrally formed clear smoked resin portion 1 and clear resin portion 2, not including the rear window RW, thereby forming the black-appearance section BA. The clear smoked rear window RW is formed in a section surrounded by the black-appearance section BA. Vehicle body color coating is applied on an outer surface of a section of the clear smoked resin portion 1 forming the vehicle body color section CA.

Figure 3:
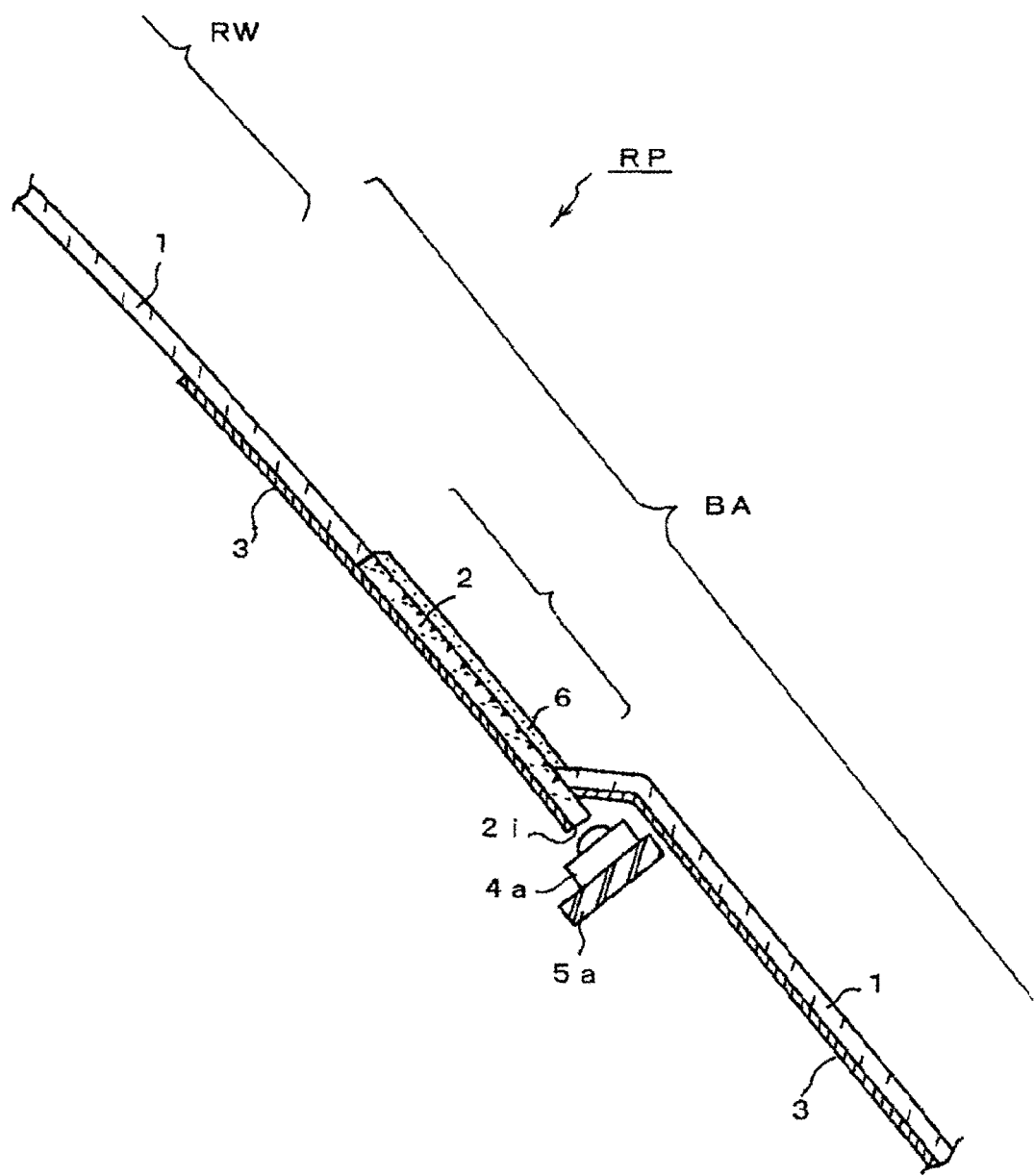
FIG. 3 is an enlarged sectional view of a region including a tail and stop lamp of FIG. 2.

FIG. 3 is an enlarged sectional view of a portion of FIG. 2, and is a sectional view of a region including the tail and stop lamp TSL. Light blocking treatment is applied on the inner surfaces of the clear smoked resin portion 1 and the clear resin portion 2 of the rear panel RP. In this exemplary embodiment, the inner surfaces are painted in black to form the black coating film 3 that serves as a light blocking layer. The black coating film 3 is visible from the outside through the clear smoked resin portion 1 and the clear resin portion 2, so that the section formed with the black coating film 3 gives the exterior appearance of the black-appearance section BA. The rear window RW is not formed with the black coating film 3, so that it is configured as a clear smoked rear window having a lowered light transmission rate.

The clear resin portion 2 is transparent, and is configured as a light guide (an example of a light guiding portion) inside which light can be guided. At least one end portion of the clear resin portion 2, this being a lower end portion in this example as illustrated in FIG. 2, is disposed inside the cavity formed on the inner side the rear panel RP. An end face 2i of the lower end portion is configured as a light entering face. Light emitting diodes (LEDs) 4a, each serving as a light source, are mounted on a narrow strip shaped base plate 5a (a supporting plate) at appropriate intervals along the longitudinal direction of the base plate 5. The base plate 5a is supported inside the cavity by a support member, not illustrated in the drawings. The light entering face 2i and the LEDs 4a are configured and arranged such that light emitted from each LED 4a enters the clear resin portion 2 from the light entering face 2i.

Figure 4:
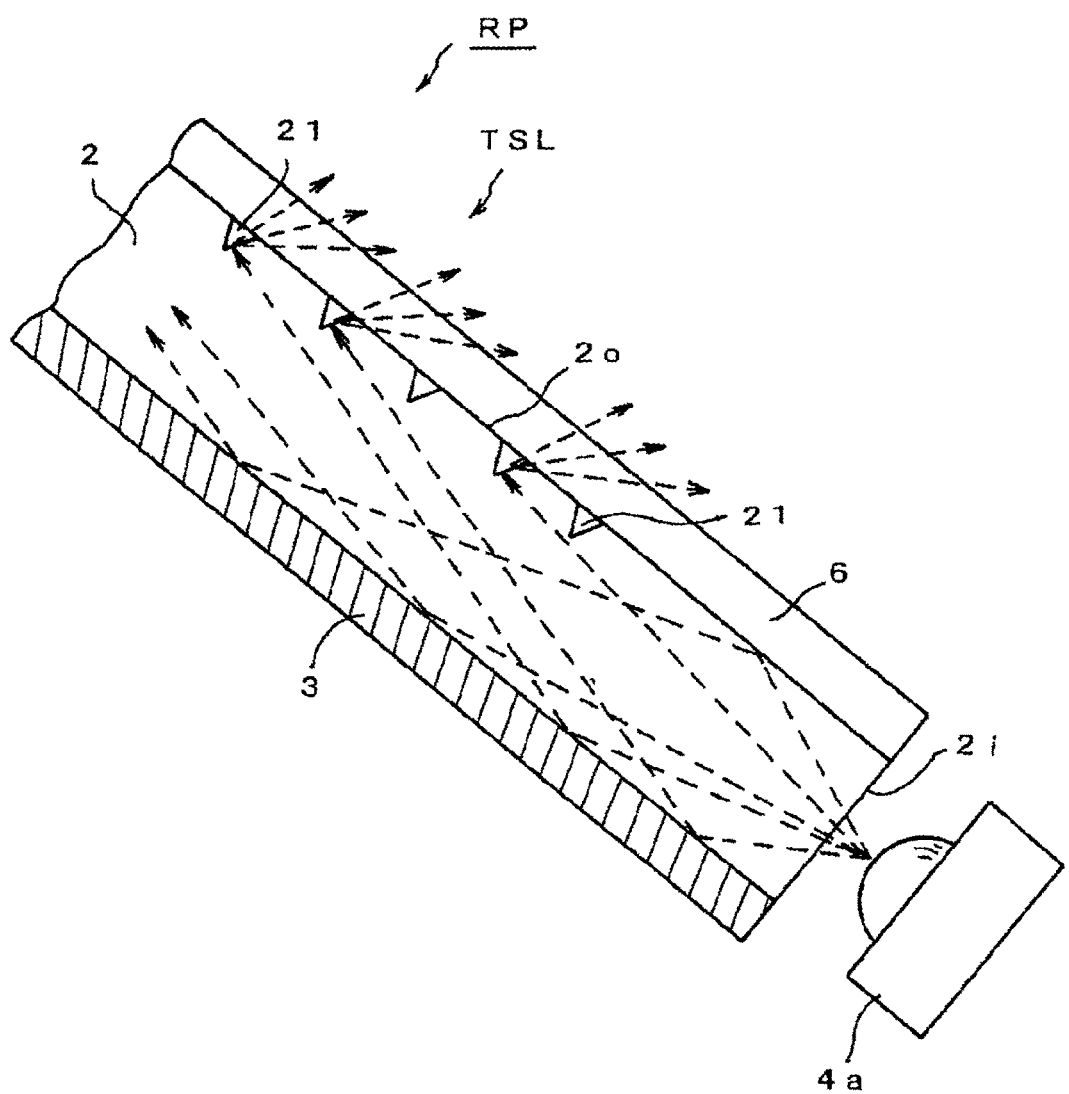
FIG. 4 is an enlarged sectional view, illustrating an operation of a light guiding portion.

FIG. 4 is an enlarged, schematic sectional view, illustrating an operation of the clear resin portion 2 of the tail and stop lamps TSL. The inner surface of the clear resin portion 2, as an example of a light guiding portion, is formed with the black coating film 3 (an example of a light blocking layer) that does not transmit light. As previously above, the black coating film 3 is formed by painting the inner surface of the rear panel RP in black. The outer surface of the clear resin portion 2 is processed to diffuse light. Specifically, the outer surface of the clear resin portion 2 is processed to have numerous stippled steps 21 as light diffusing elements. The stippled steps 21 are minute, inverted cone shaped recessed portions, and are formed in an array of an appropriate pattern on the outside surface. As illustrated by the light paths shown by broken lines in FIG. 4, the stippled steps 21 are configured such that a portion of the light emitted by the LEDs 4a and entered the clear resin portion 2 from the light entering face 2i is guided inside the clear resin portion 2 and is reflected at the internal faces of the recessed portions of the stippled steps 21 in an scarring manner and such that the portion of the light diffused by this reflection exits the clear resin portion 2 from the outer surface of the clear resin portion 2. That is, the outer surface of the clear resin portion 2 is configured as a light exiting surface 2o, serving as a light emitting surface. A protective layer 6 is formed on the outer surface of the clear resin portion 2. In this exemplary embodiment, the protective layer 6 is a hard coat film formed by applying a hard coating agent. The hard coating agent is preferably applied so as not to enter the recessed portions of stippled steps 21. However, by selecting an appropriate type of hard coating agent, it is possible to allow the hard coating agent to enter the recessed portions of the stippled steps 21 without impairing the light diffusing function.

According to the tail and stop lamps TSL of this exemplary embodiment, when observed from the rear side of the vehicle while the tail and stop lamps TSL are not turned on, the black coating film 3 on the inner surface is observed through the clear resin portion 2, giving a black external appearance. The external appearance of the tail and stop lamps TSL and the surrounding black-appearance section BA thereby blend together, such that an observer neither sees, nor recognizes, the presence of the tail and stop lamps TSL. However, when the tail and stop lamps TSL are turned on, the LEDs 4a emit light, and the light from LEDs 4a is input to the clear resin portion 2 from the light entering face 2i of the clear resin portion 2 on the lower side, and is guided inside the clear resin portion 2. As illustrated in FIG. 4, the light that has been guided is thrown and diffused by the stippled steps 21, thereby exiting from the outer surface of the clear resin portion 2, namely from the light exiting surface 2o, so that an observer can observe the sub-sections of the black-appearance section BA as light emitting surfaces that emits light brightly, and can see and recognize the light emitting surfaces as light emitted from the tail and stop lamps TSL. In the light emitted from the tail and stop lamps TSL, each of the stippled steps 21 on the outer surface of the clear resin portion 2 is observed as a dot or a shape having a give light emitting area. As there are numerous stippled steps 21, the tail and stop lamps TSL is observed such that the entire surface of the tail and stop lamps TSL emits light.

In this way, when the tail and stop lamp TSL is not turned on, the external appearance of the tail and stop lamp TSL blends together with the black-appearance section BA, and the presence of the tail and stop lamp TSL is not recognized. When the tail and stop lamp TSL is turned on, a portion of the black-appearance section BA emits light and the observer is made aware that the tail and stop lamp TSL is emitting light, thereby giving the user a sense of surprise, and giving an appearance that promotes the distinctness of the vehicle. The light is blocked by the black coating film 3 on the inner surface of the clear resin portion 2 such that, when the tail and stop lamps TSL is not turned on, the interior of the vehicle is not exposed to the view from outside the vehicle through the clear resin portion 2. When the tail and stop lamp TSL is turned on, the light guided inside the clear resin portion 2 is not sent to the inside, namely into the interior of the vehicle, thus preventing occupants, in particular the driver, from being dazzled. The hard coat film 6 on the outer surface of the clear resin portion 2 prevents the stippled steps 21 on the outer surface of the clear resin portion 2 from being damaged by external force, and also prevents dirt, moisture or the like from entering the stippled steps 21 so as not to impair the light diffusion effect.

Figure 5:
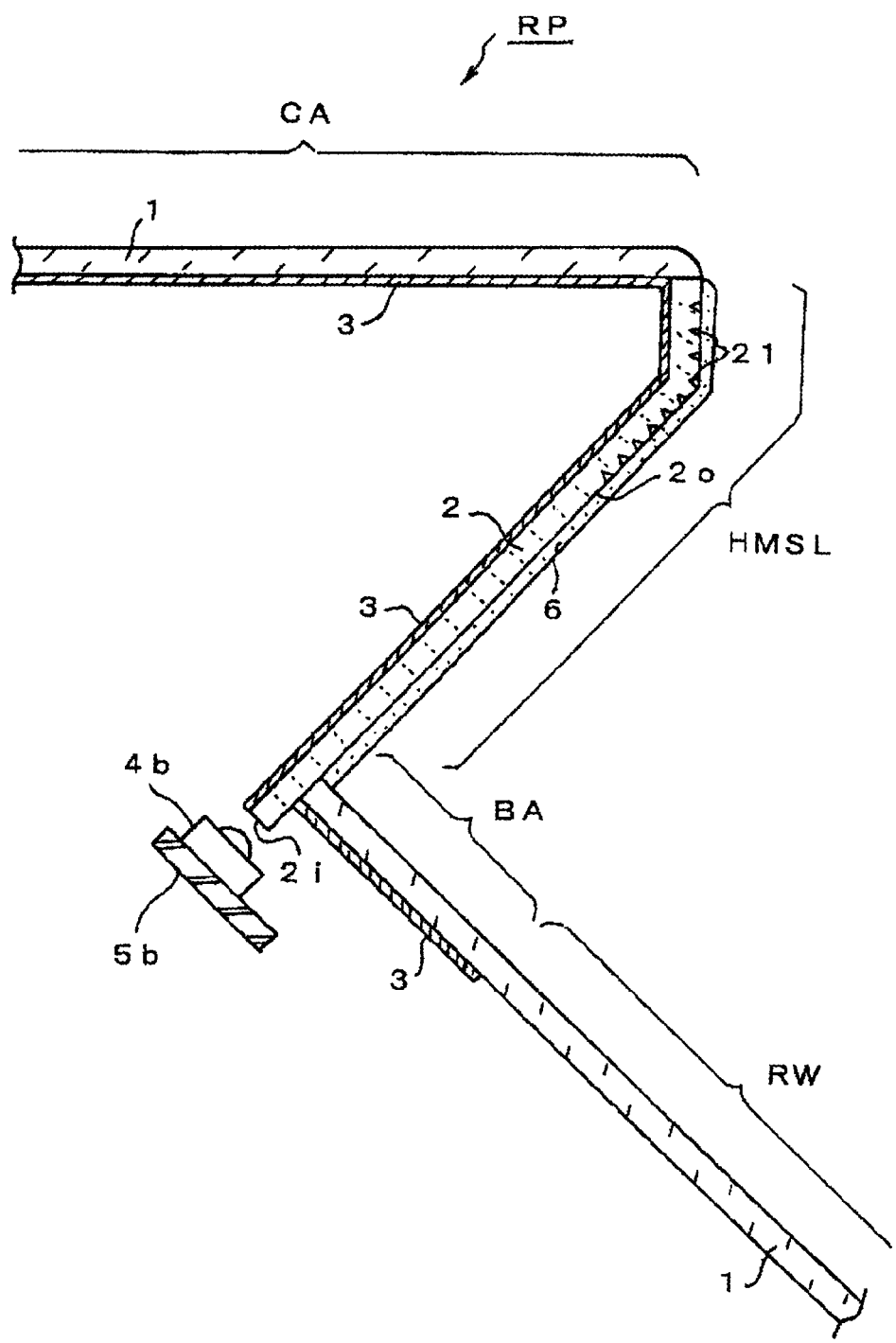
FIG. 5 is an enlarged sectional view of a region including a high mount stop lamp in FIG. 2.

FIG. 5 is an enlarged sectional view of a region of FIG. 2 including the high mount stop lamp HMSL. The clear resin portion 2 is disposed between the clear smoked resin portion 1 having a substantially horizontal surface profile on the upper side and the clear smoked resin portion 1 forming the rear window RW on the lower side. An upper end portion of the clear resin portion 2 is vertically arranged with a give height, and a portion below the upper end portion is arranged to extend inwards to form a tapered shape, that is, formed in a shape that inclines downward as it extends toward the front of the vehicle. The black coating film 3 is formed as a light blocking layer over the entire inner surface of the clear resin portion 2. Stippled steps 21 are formed on a portion of an outer surface of the clear resin portion 2 to diffuse light. Specifically, according to this exemplary embodiment, the stippled steps 21 are formed on the outer surface of the upper end portion of the clear resin portion 2 along substantially the entire width of the clear resin portion 2. The stippled steps 21 are similar to the stippled steps 21 formed on the clear resin portion 2 of tail and stop lamps TSL. Moreover, a hard coat film 6 is formed on the outer surface of the clear resin portion 2, in a similar manner as in the tail and stop lamps TSL.

A lower end face of the clear resin portion 2 of the high mount stop lamp HMSL is configured as a light entering face 2i, and LEDs 4b each serving as a light source are arranged to face the light entering face 2i. The LEDs 4b may be similar to the LEDs 4a used in the tail and stop lamps TSL, and are supported by a portion of the rear panel RP via a base plate 5b (a supporting plate). The LEDs 4b are arranged so as not to be exposed, by using for example a concealing cover (omitted from the drawings) extending from the hinge mechanism H the LEDs 4b.

When the high mount stop lamp HMSL is not turned on, the black coating film 3 on the inner surface is observed through the clear resin portion 2. The section of the high mount stop lamp HMSL therefore gives a black external appearance, and is blended with the black-appearance section BA extending along the upper side of the rear window RW. Therefore, an observer outside the vehicle can neither see nor recognize the presence of the high mount stop lamp HMSL. When the high mount stop lamp HMSL is turned on, the light from LEDs 4b is guided upwards inside the clear resin portion 2 from the light entering face 2i. The guided light is diffused by the stippled steps 21 on the upper end portion, and is sent out from the outer surface of the clear resin portion 2, i.e., from a light exiting surface 2o. Accordingly the light emits in a form of a line extending in a left-right direction along an upper end of the clear resin portion 2, whereby the observer outside the vehicle recognizes the light emitted from the high mount stop lamp HMSL.

Also with respect to the high mount stop lamp HMSL, it is not recognized as a lamp when it is not turned on, and is recognized as the lamp only when it is turned on. The observer is thereby given a sense of surprise, and an appearance that promotes the distinctness of the vehicle is given. When the high mount stop lamp HMSL is on, due to the black coating film 3 formed on the inner surface of the clear resin portion 2, the light guided inside the clear resin portion 2 does not exit toward the inside, namely into the interior of the vehicle, thereby preventing the driver from being dazzled. Moreover, the hard coat film 6 formed on the outer surface of clear resin portion 2 prevents the stippled steps 21 on the outer surface of the clear resin portion 2 from being damaged due to external forces, and also prevents dirt, moisture or and the like from entering the stippled steps 21 so as not to impair the light diffusion effect.

While a detailed description of the turn signal lamps TL and the backup lamps BL has been omitted in the description of the exemplary embodiment, they may be configured in a similar manner as the tail and stop lamps TSL. That is, each of the turn signal lamps TL and the backup lamps BL may be configured such that a clear resin portion is provided in a section including the lamp, an inner surface of the clear resin portion is formed with a black coating film to give a light blocking surface, and stippled steps are formed on an outer surface of the clear resin portion as light diffusion elements to provide a light diffusing surface, and a light source is arranged to input light into the clear resin portion. In this way, the turn signal lamps TL and the backup lamps BL can be configured as lamps with an external appearance that conveys a sense of surprise to the observer, similarly to the tail and stop lamps TSL. Alternatively, the turn signal lamps TL and the backup lamps BL may be configured as those of conventional types, such as multipurpose thin type lamps.

The light blocking surface on the inner surface of the clear resin portion is not limited to a configuration in which a black coating film is provided, in so far as it blocks light. For example, a black resin film having light blocking properties may be integrated with the inner surface of the clear smoked resin portion and/or the clear resin portion. Alternatively, lens steps may be formed on the inner surface of the clear resin portion such that light does not exit therefrom. Moreover, the color of the light blocking layer is not limited to black, and may be any color chosen in relation to the vehicle body coating color. Furthermore, a hard coat film as a protective layer and/or an antifog film to prevent fogging may be formed as additional layers on the light blocking layer.

According to the exemplary embodiment described above, in providing the rear panel, the clear resin portion and the clear smoked resin portion are formed integrally by two-color molding when configuring the rear panel. However, the resin portions may be provided integrally by an adhesion or a welding. Alternatively, the resin portions may be provided integrally by a mechanical connection, e.g., using fastening means such as screws.

To configure the light exiting surface of the clear resin portion (an example of light guiding portion) as the light diffusing surface such that the light guided inside the clear resin portion is diffused and sent toward the outside, the stippled steps may not be provided. Instead, the outer surface of the clear resin portion may be roughened by frosting, or the surface face may be thinly and selectively coated with a light diffusing material such as a fine, transparent grained material.

As for the light source, a semi-conductor light emitting device such as an LED is preferable in that the light can be input into the light guiding portion with high efficiency. However, the light source is not limited to a semi-conductor light emitting device, and a light bulb or other light emitting devices may also be used. Moreover, as for the protective layer on the outer surface of the light guiding portion, forming a hard coat film is preferable in a case in which the light exiting surface is formed with stippled steps. However, the protective layer may be in an optional form, depending on the configuration of the light diffusing surface. For example, a protective film may be adhered.

In the above exemplary embodiment, the present invention is applied to the tail and stop lamp and the high mount stop lamp arranged in the rear panel of the vehicle. However, the present invention may also be applied to other lamps, such as a turn signal lamp or a backup lamp.

The present invention is applicable to a lamp arranged in a vehicle body panel, such as a vehicle rear panel made of resin, and also to the vehicle body panel.

What is claimed is:

1. A vehicle lamp comprising:
    a light guiding portion being a portion of a vehicle body panel of a vehicle, the vehicle body panel comprising a transparent portion and a colored portion, the transparent portion and the colored portion being arranged adjacent to one another along an exterior surface of the vehicle body panel, the light guiding portion being the transparent portion of the vehicle body panel; and
    a light source arranged to input light into the light guiding portion such that the light is guided inside the light guiding portion,
    wherein the light guiding portion comprises an inner surface and an outer surface, the inner surface being configured to face toward an inside of the vehicle and to serve as a light blocking surface to block the light, and the outer surface being configured to face toward an outside of the vehicle and to serve as a light exiting surface from which the light is allowed to exit the light guiding portion, and
    wherein the transparent portion and the colored portion both transmit respective portions of the light therethrough; and
    at least a portion of the colored portion is a window for viewing through.

2. The vehicle lamp according to claim 1, wherein a light blocking layer is provided on the inner surface of the light guiding portion.

3. The vehicle lamp according to claim 1, wherein the outer surface of the light guiding portion is configured to diffuse the light.

4. The vehicle lamp according to claim 3, wherein the outer surface comprises light diffusing elements to diffuse the light.

5. The vehicle lamp according to claim 4, wherein the light diffusing elements are inverted cone shaped recessed portions arranged in an array on the outer surface.

6. The vehicle lamp according to claim 3, further comprising a transparent protective layer covering the outer surface.

7. The vehicle lamp according to claim 6, wherein the protective layer is a hard coat film.

8. The vehicle lamp according to claim 1, wherein the light guiding portion is configured to be arranged in a section other than a window section of the vehicle body panel.

9. The vehicle lamp according to claim 1, wherein the transparent portion and the colored portion are formed as unitary and continuous portions of the vehicle body panel.

10. The vehicle lamp according to claim 1, wherein the light blocking surface extends across the entire inner surface of the transparent portion.

11. The vehicle lamp according to claim 10, wherein the light blocking surface further extends across a portion of an inner surface of the colored portion.

12. A vehicle rear panel comprising:
    a resin molded portion forming an exterior portion of the vehicle rear panel; and
    a vehicle lamp being provided as a portion of the vehicle rear panel, the vehicle rear panel comprising a transparent portion and a colored portion, the transparent portion and the colored portion being arranged adjacent to one another along an exterior surface of the vehicle rear panel,
    wherein the vehicle lamp comprises a light guiding portion, and a light source arranged to input light into the light guiding portion such that the light is guided inside the light guiding portion, the light guiding portion being the transparent portion of the vehicle rear panel, wherein the light guiding portion comprises an inner surface and an outer surface, the inner surface being configured to face toward an inside of a vehicle and to serve as a light blocking surface to block the light, and the outer surface being configured to face toward an outside of the vehicle and to serve as a light exiting surface from which the light is allowed to exit the light guiding portion, and wherein the transparent portion and the colored portion both transmit respective portions of the light therethrough;

at least a portion of the colored portion is a window for viewing through.

13. The vehicle rear panel according to claim 12, wherein the transparent portion and the colored portion are formed as unitary and continuous portions of the vehicle rear panel.

14. The vehicle rear panel according to claim 12, wherein the light blocking surface extends across the entire inner surface of the transparent portion.

15. The vehicle rear panel according to claim 14, wherein the light blocking surface further extends across a portion of an inner surface of the colored portion.

* * * * *